(12) United States Patent
Yoshida et al.

(10) Patent No.: US 12,286,118 B2
(45) Date of Patent: Apr. 29, 2025

(54) HYBRID ELECTRIC VEHICLE

(71) Applicant: TOYOTA JIDOSHA KABUSHIKI KAISHA, Aichi-ken (JP)

(72) Inventors: Takahiro Yoshida, Nagoya (JP); Masahiro Kachi, Nagakute (JP); Satoshi Masuda, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 194 days.

(21) Appl. No.: 18/066,284

(22) Filed: Dec. 15, 2022

(65) Prior Publication Data
US 2023/0294704 A1 Sep. 21, 2023

(30) Foreign Application Priority Data
Mar. 16, 2022 (JP) .................................. 2022-041614

(51) Int. Cl.
| | |
|---|---|
| *B60W 30/192* | (2012.01) |
| *B60W 10/02* | (2006.01) |
| *B60W 10/06* | (2006.01) |
| *B60W 10/08* | (2006.01) |
| *B60W 20/00* | (2016.01) |

(52) U.S. Cl.
CPC .......... *B60W 30/192* (2013.01); *B60W 10/02* (2013.01); *B60W 10/06* (2013.01); *B60W 10/08* (2013.01); *B60W 20/00* (2013.01); *B60W 2510/0208* (2013.01); *B60W 2510/0638* (2013.01); *B60W 2510/0676* (2013.01); *B60W 2510/081* (2013.01); *B60W 2540/10* (2013.01); *B60W 2710/0644* (2013.01)

(58) Field of Classification Search
CPC .... B60W 30/192; B60W 10/02; B60W 10/06; B60W 10/08; B60W 20/00; B60W 2510/0208; B60W 2510/0638; B60W 2510/0676; B60W 2510/081; B60W 2540/10; B60W 2710/0644
USPC .......................................................... 701/22
See application file for complete search history.

(56) References Cited

U.S. PATENT DOCUMENTS

| | | | |
|---|---|---|---|
| 11,383,695 B2 * | 7/2022 | Matsuda | ................ B60W 10/11 |
| 2005/0245351 A1 * | 11/2005 | Yamada | ................ F02D 41/023 |
| | | | 477/110 |
| 2014/0080663 A1 | 3/2014 | Nakanishi et al. | |

(Continued)

FOREIGN PATENT DOCUMENTS

| | | | | |
|---|---|---|---|---|
| CN | 103764469 A | * | 4/2014 | ............... B60K 6/48 |
| JP | 2013155605 A | * | 8/2013 | |
| JP | 201458259 A | | 4/2014 | |

(Continued)

*Primary Examiner* — Fadey S. Jabr
*Assistant Examiner* — Ahmed Alkirsh
(74) *Attorney, Agent, or Firm* — HAUPTMAN HAM, LLP

(57) ABSTRACT

The hybrid electric vehicle includes an engine, a motor, a clutch, an accelerator operation amount detecting unit, and a control device. The control device is configured to include: a determination unit configured to determine whether or not the accelerator operation amount is equal to or greater than a threshold value when there is a start request for the engine; and an ignition timing control unit configured to advance an ignition timing of the engine, when an affirmative determination is made by the determination unit, than when a negative determination is made by the determination unit.

6 Claims, 7 Drawing Sheets

(56) References Cited

U.S. PATENT DOCUMENTS

| | | | | |
|---|---|---|---|---|
| 2016/0167666 | A1* | 6/2016 | Oohata | F16D 48/06 |
| | | | | 477/166 |
| 2021/0129830 | A1* | 5/2021 | Matsubara | B60K 6/547 |

FOREIGN PATENT DOCUMENTS

| | | | |
|---|---|---|---|
| JP | 2015164831 A * | 9/2015 | |
| JP | 2018105200 A | 7/2018 | |
| JP | 202154165 A | 4/2021 | |

* cited by examiner

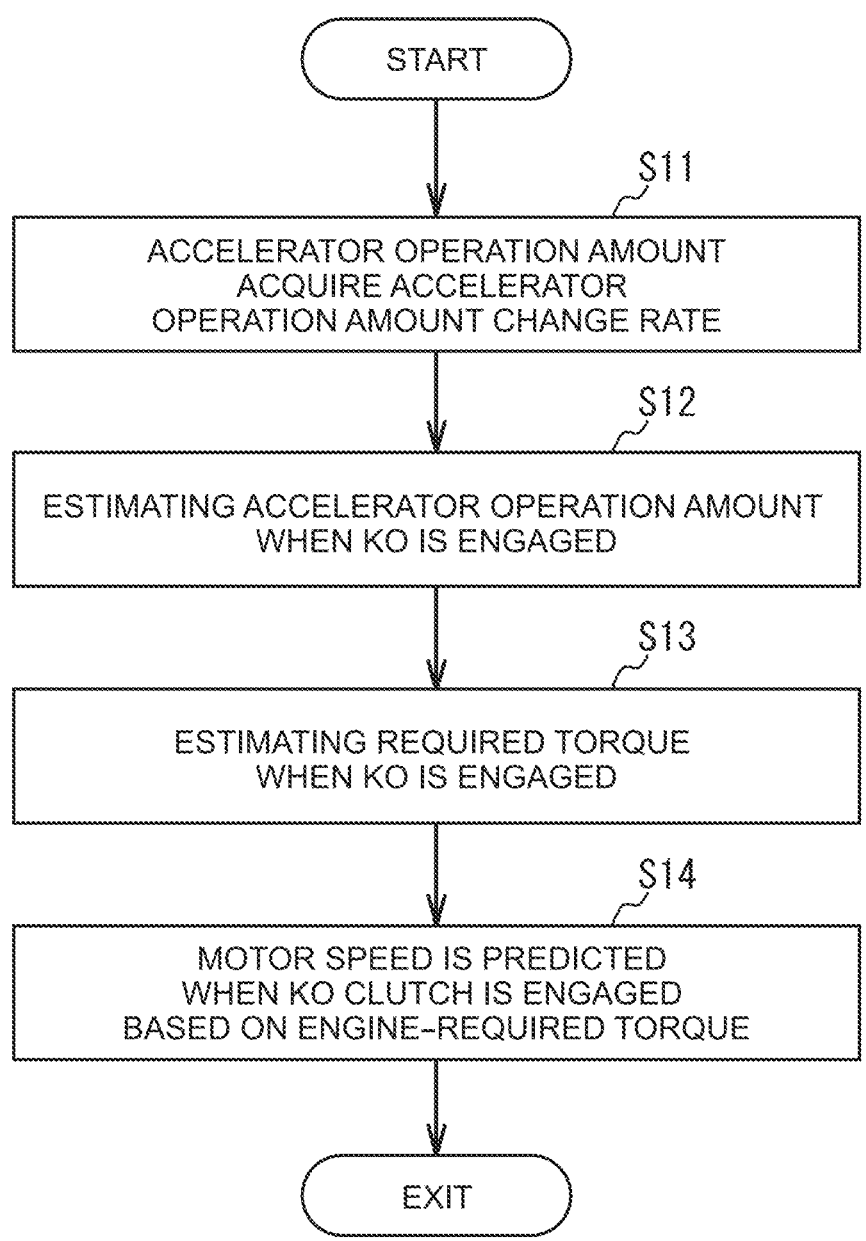

HYBRID ELECTRIC VEHICLE

CROSS-REFERENCE TO RELATED APPLICATION

This application claims priority to Japanese Patent Application No. 2022-041614 filed on Mar. 16, 2022, incorporated herein by reference in its entirety.

BACKGROUND

1. Technical Field

The present disclosure relates to a hybrid electric vehicle.

2. Description of Related Art

There is a hybrid electric vehicle including an engine, a motor provided on a power transmission path from the engine to drive wheel, and a clutch provided on the power transmission path between the engine and the motor. In such a hybrid electric vehicle, when a start request of the engine is given in a state where the clutch is released, combustion in the engine is started while the engine is cranked by the motor via the clutch, and the clutch is engaged. Thus, the engine is started (see, for example, Japanese Unexamined Patent Application Publication No. 2021-054165 (JP 2021-054165 A)).

SUMMARY

When an accelerator operation amount operated by a driver at the time of starting the engine is large, that is, when the degree of an acceleration request by the driver is large and an increase speed of engine torque is low, there is a possibility that acceleration responsiveness to the request by the driver decreases.

An object of the present disclosure is to provide a hybrid electric vehicle in which the acceleration responsiveness has improved at the time of starting the engine.

A hybrid electric vehicle according to a first aspect of the present disclosure includes:
  an engine;
  a motor provided on a power transmission path from the engine to a drive wheel;
  a clutch provided on the power transmission path between the engine and the motor;
  an accelerator operation amount detecting unit for detecting an accelerator operation amount; and
  a control device that starts combustion in the engine while cranking the engine by the motor via the clutch and engages the clutch when a start request of the engine is given in a release state of the clutch.
  Here, the control device is configured to include:
  a determination unit configured to determine whether the accelerator operation amount is equal to or larger than a threshold value when the start request of the engine is given; and an ignition timing control unit configured to advance an ignition timing of the engine when an affirmative determination is made by the determination unit than when a negative determination is made by the determination unit.

In the hybrid electric vehicle according to the first aspect, the control device may further include a predicting unit that predicts a rotational speed of the motor when the clutch is engaged, and the ignition timing control unit may be configured to advance the ignition timing as the predicted rotational speed of the motor increases.

The hybrid electric vehicle according to the first aspect may further include a motor rotational speed detecting unit configured to detect a rotational speed of the motor. Here, the ignition timing control unit may be configured to advance the ignition timing as the rotational speed of the motor increases.

The hybrid electric vehicle according to the first aspect may further include a temperature detecting unit configured to detect a temperature of the engine. Here, the ignition timing control unit may be configured to advance the ignition timing as the temperature of the engine decreases.

The hybrid electric vehicle according to the first aspect may further include an engine speed detecting unit configured to detect a speed of the engine. Here, the ignition timing control unit may be configured to advance the ignition timing as the speed of the engine increases.

In the hybrid electric vehicle according to the first aspect, the ignition timing control unit may be configured to advance the ignition timing as the accelerator operation amount increases.

According to the present disclosure, it is possible to provide a hybrid electric vehicle in which the acceleration responsiveness has improved at the time of starting the engine.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flowchart illustrating an example of the motor rotational speed prediction control;

DETAILED DESCRIPTION OF EMBODIMENTS

Schematic Configuration of the Hybrid Electric Vehicle

Figure 1:
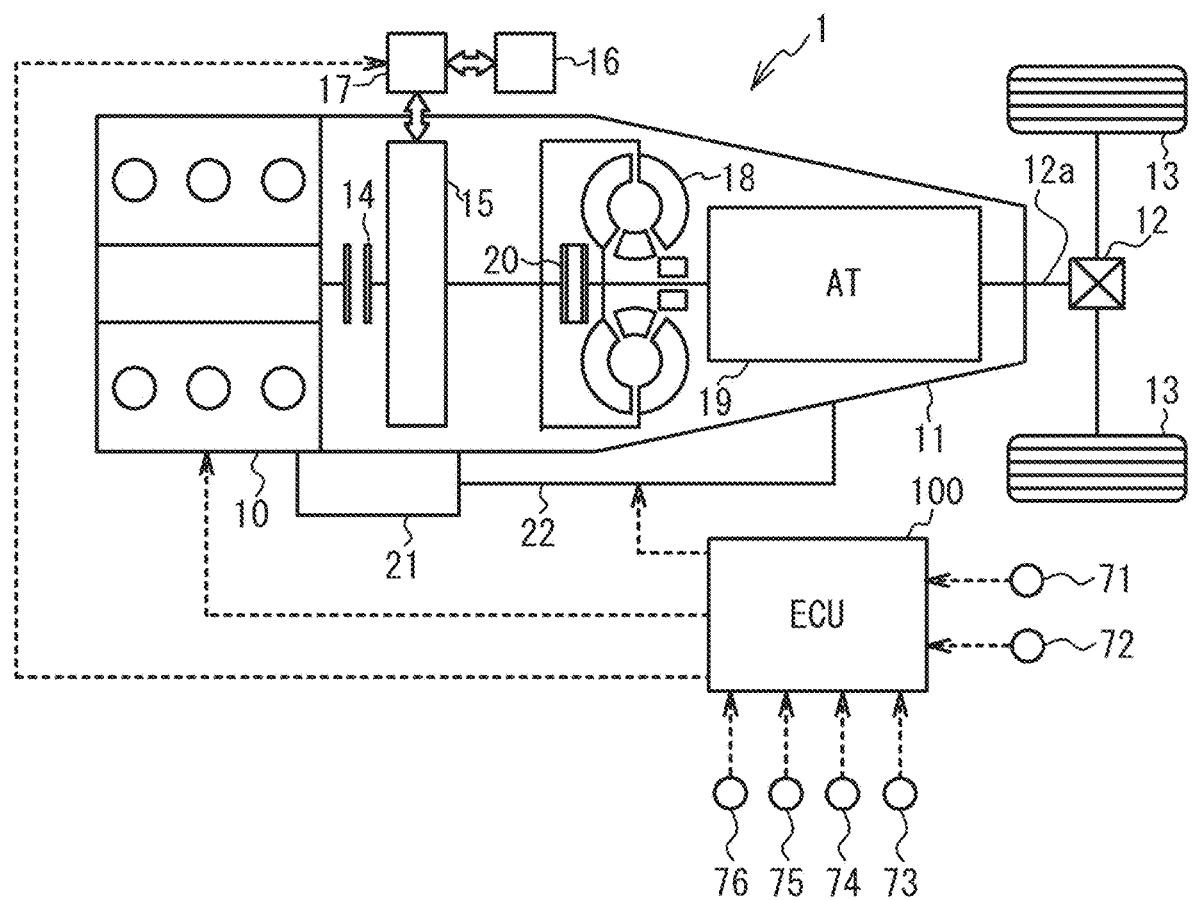
FIG. 1 is a schematic configuration diagram of a hybrid electric vehicle.

FIG. 1 is a schematic configuration diagram of a hybrid electric vehicle 1. In the hybrid electric vehicle 1, a K0 clutch 14, a motor 15, a torque converter 18, and a transmission 19 are provided in this order in a power transmission path from the engine 10 to the drive wheels 13. The engine 10 and the motor 15 are mounted as a driving source for traveling of the hybrid electric vehicle 1. The engine 10 is, for example, a V-type 6-cylinder gasoline engine, but the number of cylinders is not limited thereto. The engine 10 may be a series type gasoline engine or a diesel engine. K0 clutch 14, the motor 15, the torque converter 18, and the transmission 19 are provided in the transmission unit 11. The transmission unit 11 and the left and right drive wheels 13 are drivingly connected to each other via a propeller shaft 12a and a differential 12.

K0 clutch 14 is provided between the motor 15 and the engine 10 on the same power transmission path. K0 clutch 14 is supplied with hydraulic pressure from the released state to be brought into an engaged state, and connects the power transmission between the engine 10 and the motor 15. K0 clutch 14 is released in response to the stoppage of the hydraulic pressure supply and shuts off the power transmission between the engine 10 and the motor 15. The engagement state is a state in which both engagement elements of K0 clutch 14 are coupled to each other, and the engine 10 and the motor 15 have the same rotational speed. The disengaged state is a state in which both engagement elements of K0 clutches 14 are separated from each other.

The motor 15 is connected to the battery 16 via an inverter 17. The motor 15 functions as a motor that generates a driving force of the vehicle in response to power supply from the battery 16. The motor 15 also functions as a generator that generates electric power to charge the battery 16 in response to power transmission from the engine 10 and the drive wheels 13. The electric power exchanged between the motor 15 and the battery 16 is adjusted by the inverter 17.

The inverters 17 are controlled by an ECU 100 which will be described later. The inverter 17 converts a DC voltage from the battery 16 into an AC voltage, or converts an AC voltage from the motor 15 into a DC voltage. In the case of power running operation in which the motor 15 outputs torque, the inverter 17 converts the DC voltage of the battery 16 into an AC voltage and adjusts the electric power supplied to the motor 15. In the case of the regenerative operation generated by the motor 15, the inverter 17 converts the AC voltage from the motor 15 into a DC voltage and adjusts the electric power supplied to the battery 16.

The torque converter 18 is a fluid coupling having a torque amplification function. The transmission 19 is a stepped automatic transmission in which the gear ratio is switched in multiple stages by switching the gear stages, but the present disclosure is not limited thereto, and may be a continuously-type automatic transmission. The transmission 19 is provided between the motor 15 and the drive wheels 13 on the power transmission path. The motor 15 and the transmission 19 are coupled to each other via the torque converter 18. The torque converter 18 is provided with a lock-up clutch 20 that receives a supply of hydraulic pressure and is in an engaged state to directly couple the motor 15 and the transmission 19.

The transmission unit 11 is further provided with an oil pump 21 and a hydraulic control mechanism 22. Hydraulic pressure generated by the oil pump 21 is supplied to K0 clutch 14, the torque converter 18, the transmission 19, and the lockup clutch 20 via the hydraulic control mechanism 22. The hydraulic control mechanism 22 is provided with hydraulic circuits of K0 clutch 14, the torque converter 18, the transmission 19, and the lockup clutch 20, and various hydraulic control valves for controlling the hydraulic pressures. A wet clutch may be provided instead of the torque converter 18.

The hybrid electric vehicle 1 is provided with an Electronic Control Unit (ECU) 100 as a control device of the vehicle. ECU 100 is an electronic control unit including an arithmetic processing unit that performs various arithmetic processing related to travel control of vehicles, and a memory that stores control programs and data. ECU 100 is an exemplary control device for a hybrid electric vehicle, and functionally realizes a determination unit, an ignition timing control unit, and a predicting unit, which will be described later.

ECU 100 controls driving of the engine 10 and the motor 15. Specifically, ECU 100 controls the rotational speed and torque of the engine 10 by controlling the throttle valve opening degree, the ignition timing, and the fuel injection amount of the engine 10. ECU 100 controls the rotational speed and torque of the motor 15 by controlling the inverters 17 to adjust the amount of transfer of electric power between the motor 15 and the battery 16. ECU 100 controls driving of K0 clutch 14, the lock-up clutch 20, and the transmission 19 through control of the hydraulic control mechanism 22.

Signals from the ignition switch 71, the crank angle sensor 72, the motor rotational speed sensor 73, the accelerator operation amount sensor 74, the air flow meter 75, and the water temperature sensor 76 are inputted to ECU 100. The crank angle sensor 72 detects the rotational speed of the crankshaft of the engine 10. The crank angle sensor 72 is an example of an engine speed detecting unit. The motor rotational speed sensor 73 detects the rotational speed of the output shaft of the motor 15. The motor rotational speed sensor 73 is an example of a motor rotational speed detecting unit. The accelerator operation amount sensor 74 detects an accelerator pedal operation amount that is a depression amount of the accelerator pedal of the driver. The accelerator operation amount sensor 74 is an example of an accelerator operation amount detecting unit. The air flow meter 75 detects an intake air amount of the engine 10. The water temperature sensor 76 detects the temperature of the coolant for cooling the engine 10. The temperature of the coolant correlates with the temperature of the engine 10. The water temperature sensor 76 is an example of an engine temperature detecting unit. The engine temperature detecting unit may be, for example, an oil temperature sensor that detects the temperature of the lubricating oil that lubricates the engine 10 correlated with the temperature of the engine 10.

ECU 100 causes the hybrid electric vehicles to travel in either the motor mode or the hybrid mode. In the motor mode, ECU 100 releases K0 clutch 14, and the hybrid electric vehicle 1 travels by the power of the motor 15. In the hybrid mode, ECU 100 switches K0 clutch 14 to the engaged condition, and the hybrid electric vehicle 1 is driven by at least the power of the engine 10. Note that the hybrid mode includes a mode in which the engine 10 is driven by power only, and a mode in which the motor 15 is driven by power to drive both the engine 10 and the motor 15 as power sources.

The driving mode is switched based on the required driving force of the vehicle obtained from the vehicle speed and the accelerator operation amount, the state of charge of the battery 16, and the like. For example, when the required driving force is relatively small and state of charge (SOC) indicating the storage capacity of the battery 16 is relatively large, the motor mode in which the engine 10 is stopped is selected in order to improve the fuel efficiency. When the required driving force is relatively large or SOC of the battery 16 is relatively low, a hybrid mode for driving the engine 10 is selected.

In the hybrid mode, ECU 100 automatically stops the engine 10 when a predetermined stop condition is satisfied, and executes intermittent operation control for starting the engine 10 that has automatically stopped when a predetermined start condition is satisfied. For example, ECU 100 automatically stops the engine 10 when the accelerator operation amount becomes zero in the hybrid mode. When the accelerator operation amount is greater than zero, ECU 100 automatically starts the engine 10 on the assumption that the starting condition is satisfied. When the engine 10 is automatically stopped, ECU 100 releases K0 clutch 14 to stop the fuel-injection. When the engine 10 is automatically started, ECU 100 cranks the engine 10 by the motor 15 via K0 clutch 14, starts fuel injection and ignition, and then engages K0 clutch 14.

Schematic Configuration of the Engine

Figure 2:
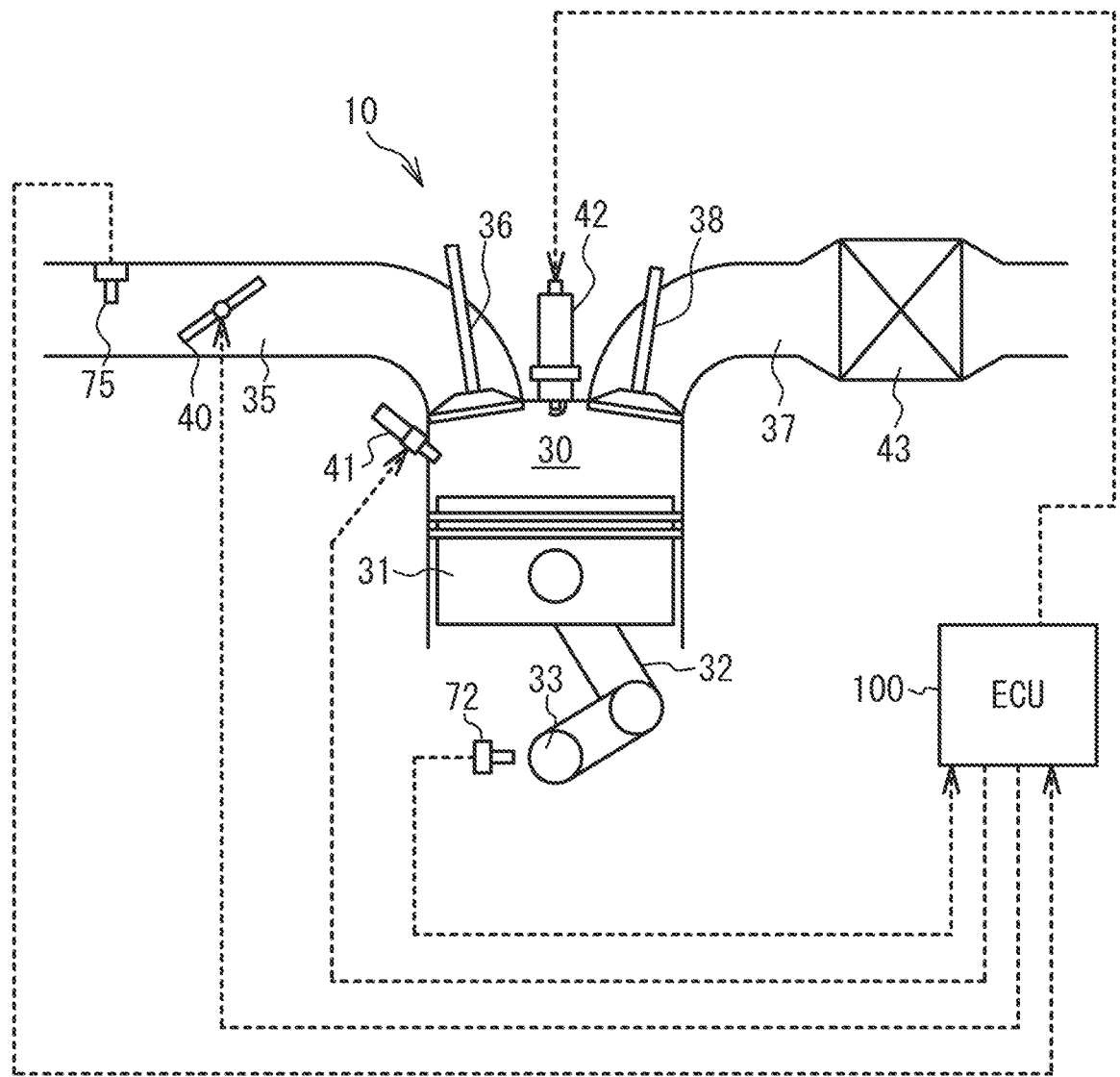
FIG. 2 is a schematic configuration diagram of an engine.

FIG. 2 is a schematic configuration diagram of the engine 10. The engine 10 includes a cylinder 30, a piston 31, a connecting rod 32, a crankshaft 33, an intake passage 35, an intake valve 36, an exhaust passage 37, and an exhaust valve 38. In FIG. 2, only one of the plurality of cylinders 30 of the engine 10 is displayed. In the cylinder 30, combustion of the air-fuel mixture is performed. The piston 31 is reciprocally accommodated in each cylinder 30, and is connected to a crankshaft 33, which is an output shaft of the engine 10, via a connecting rod 32. The connecting rod 32 converts the reciprocating motion of the piston 31 into a rotational motion of the crankshaft 33.

The intake passage 35 is connected to an intake port of each cylinder 30 via an intake valve 36. The exhaust passage 37 is connected to an exhaust port of each cylinder 30 via an exhaust valve 38. The intake passage 35 is provided with an air flow meter 75 and a throttle valve 40 for adjusting an amount of intake air. A catalyst 43 for exhaust gas purification is provided in the exhaust passage 37.

The cylinder 30 is provided with an in-cylinder injection valve 41. The in-cylinder injection valve 41 injects fuel directly into the cylinder 30. Instead of the in-cylinder injection valve 41 or in addition to the in-cylinder injection valve 41, a port injection valve that injects fuel toward the intake port may be provided. Each cylinder 30 is provided with an ignition device 42 that ignites an air-fuel mixture of the intake air introduced through the intake passage 35 and the fuel injected by the in-cylinder injection valve 41 by spark discharge.

When the engine 10 configured as described above is requested to start with K0 clutch 14 released, ECU 100 controls the engine 10, K0 clutch 14, and the motor 15 as follows. ECU 100 causes the motor 15 to crank the engine 10 via K0 clutch 14 by slipping K0 clutch 14 to increase the torque of the motor 15. When the engine speed becomes equal to or higher than the predetermined value, ECU 100 starts burning in the engine 10 and engages K0 clutch 14 in synchronization with the engine speed and the motor speed. In this way, the start of the engine 10 is completed. Here, when the accelerator operation amount operated by the driver at the time of starting the engine 10 is large, that is, when the degree of the acceleration request by the driver is large, when the increase speed of the engine torque is slow, there is a possibility that the acceleration responsiveness decreases with respect to the driver's request. Therefore, ECU 100 advances the ignition timing of the engine 10 to increase the engine torque at an early stage when the engine 10 is requested to start and the accelerator operation amount is large. Details will be described below.

Engine Start Control

Figure 3:
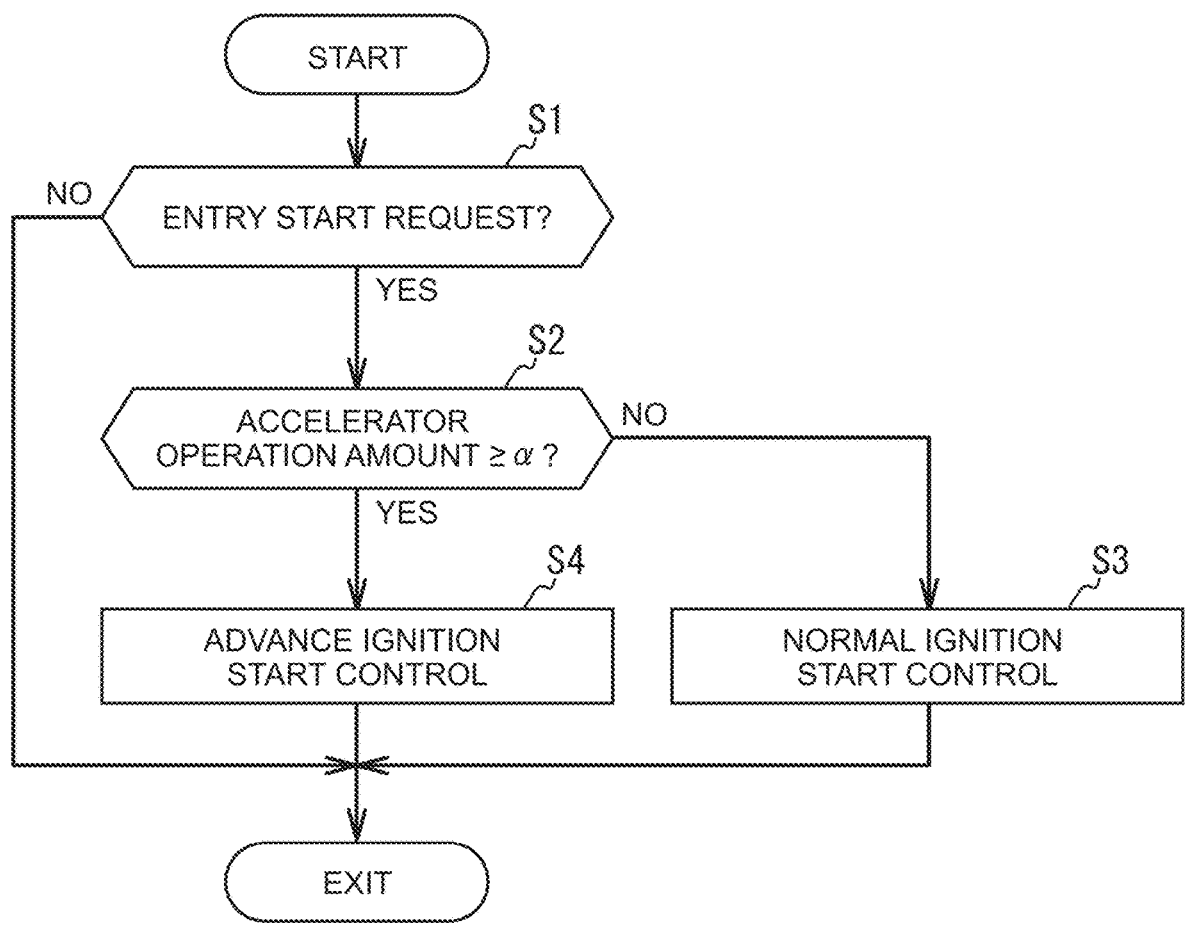
FIG. 3 is a flow chart illustrating an exemplary engine-start control performed by ECU.

FIG. 3 is a flow chart illustrating an exemplary engine-start control executed by ECU 100. This control is repeatedly executed at predetermined intervals in a state where the ignition is on. ECU 100 determines whether or not there is a need to start the engine 10 (step S1). If S1 of steps is No, this control ends. If Yes in step S1, ECU 100 determines whether or not the accelerator operation amount is equal to or greater than the threshold a (step S2). The threshold value $\alpha$ is set to a minimum value in which the degree of acceleration request by the driver is large and the advance angle of the ignition timing is required. Step S2 is an exemplary process executed by the determination unit.

When the step S2 is No, ECU 100 executes the normal ignition start control (step S3) by considering that the degree of the acceleration demand by the driver is small. In the normal ignition start control, the ignition timing is controlled based on the temperature of the coolant, the engine speed, and the predicted motor speed, which will be described in detail later, to start the engine 10.

When the step S2 is Yes, ECU 100 executes the advance ignition start control (step S4) on the assumption that the degree of the acceleration demand by the driver is large. In the advance ignition start control, the ignition timing is set to the advance side rather than the normal ignition start control, and the engine 10 is started. Similarly to the normal ignition start control, the ignition timing of the advance ignition start control is controlled based on the temperature of the coolant, the engine speed, and the predicted motor speed. The step S4 is an exemplary process executed by the ignition timing control unit.

Figure 4A:
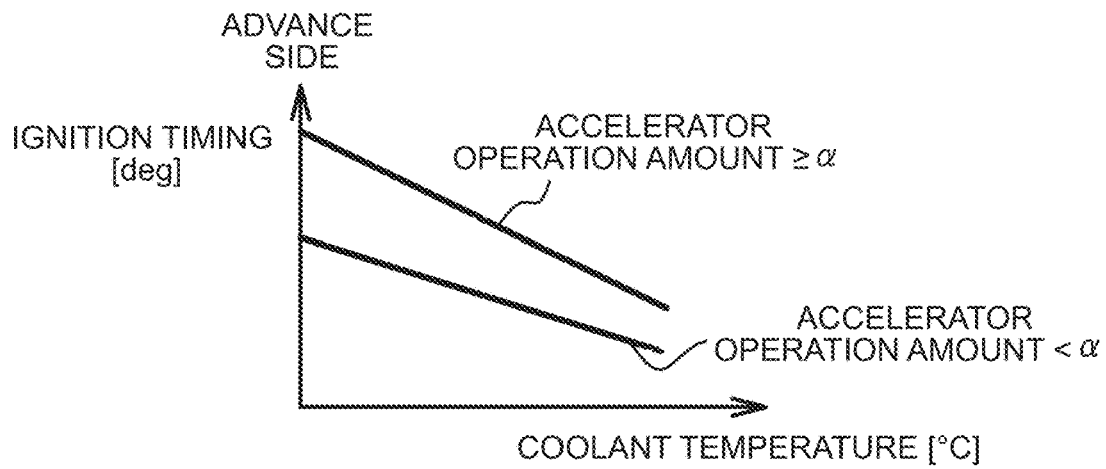
FIG. 4A is an exemplary map defining the ignition timing.
Figure 4B:
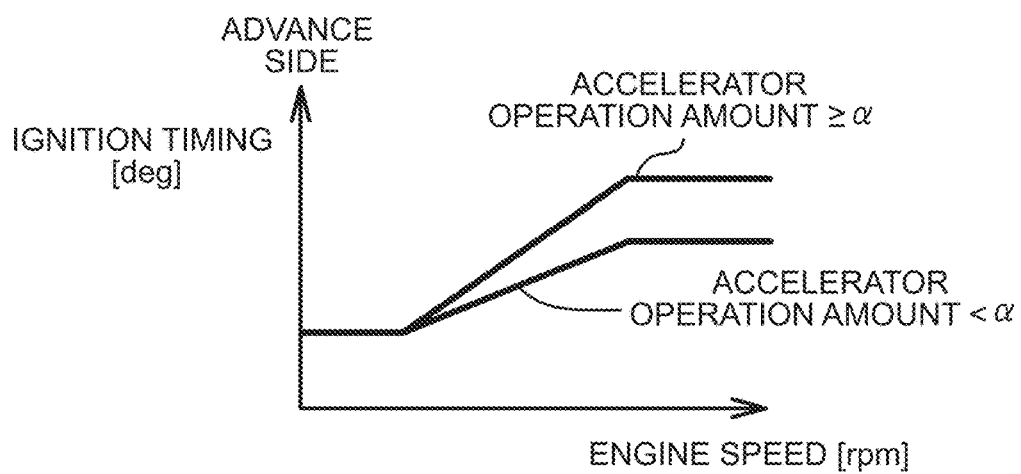
FIG. 4B is an exemplary map defining the ignition timing.
Figure 4C:
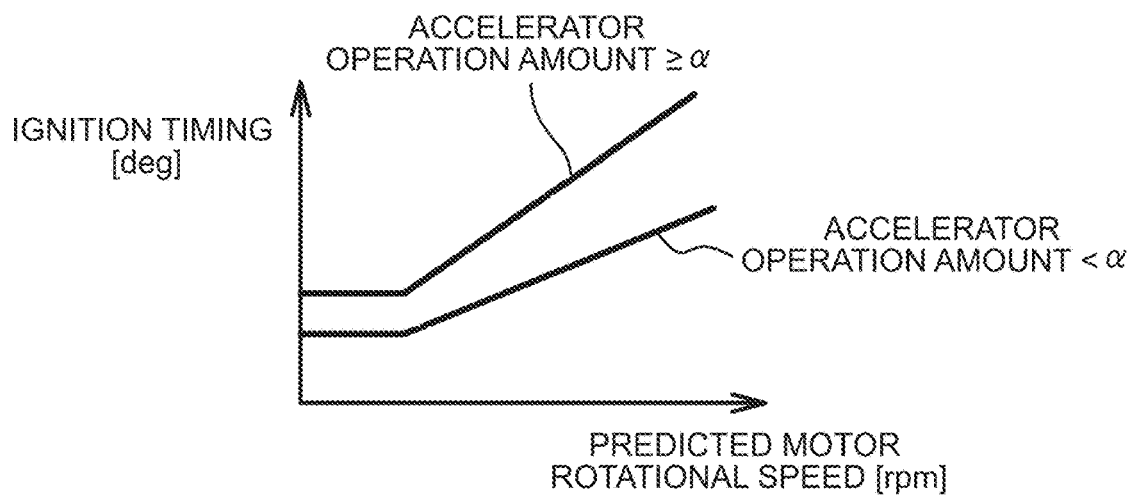
FIG. 4C is an exemplary map defining the ignition timing.

In the normal ignition start control and the advance ignition start control, ECU 100 refers to the map of the FIG. 4C from FIG. 4A to control the ignition timing. FIG. 4A, FIG. 4B, and FIG. 4C are exemplary maps that define the ignition timing. From FIGS. 4A to 4C, the ignition timing when the accelerator operation amount is less than the threshold value $\alpha$ and the ignition timing when the accelerator operation amount is equal to or greater than the threshold value $\alpha$ are shown.

FIG. 4A is an example of a map that defines a relation between an ignition timing and a coolant temperature. The vertical axis indicates the ignition timing [deg], and the horizontal axis indicates the coolant temperature [° C.]. As shown in 4A, when the accelerator operation amount is either less than the threshold value $\alpha$ or greater than or equal to the threshold value $\alpha$, the ignition timing is defined to be advanced as the temperature of the coolant detected by the water temperature sensor 76 is lower. This is because the lower the temperature of the coolant, the more likely the engine torque is to decrease, and it is preferable to advance the ignition timing so as to compensate for the decrease in the engine torque. Further, when the accelerator operation amount is equal to or greater than the threshold value $\alpha$, the ignition timing is defined to be on the advance side as compared with the case where the accelerator operation amount $\alpha$ is less than the accelerator operation amount $\alpha$. When the accelerator operation amount is equal to or greater than the threshold value $\alpha$, the degree of acceleration request by the driver is large, and it is preferable to increase the engine torque at an early stage from the viewpoint of acceleration responsiveness.

In the map of FIG. 4A, the rate of increase in the advance angle of the ignition timing with respect to the decrease in the temperature of the coolant is defined to be larger when the accelerator operation amount is equal to or larger than the threshold value $\alpha$ than when the accelerator operation amount is equal to or larger than the threshold value $\alpha$. This is because, even when the amount of decrease in the coolant temperature is the same, the influence on the decrease in the engine torque is larger than that in the case where the accelerator operation amount is larger than that in the case where the accelerator operation amount is smaller.

FIG. 4B is an exemplary map that defines the relation between the ignition timing and the engine-speed. The vertical axis indicates the ignition timing [deg], and the horizontal axis indicates the engine speed [rpm]. As shown in 4B, when the accelerator operation amount is less than the threshold value α or greater than or equal to the threshold value α, the ignition timing is defined to be advanced as the engine speed detected by the crank angle sensor 72 is higher. This is because, by advancing the ignition timing when the engine speed is high, the combustion speed can be increased, and the timing at which the in-cylinder pressure is maximized can be made to correspond to the optimum timing with high torque efficiency. In addition, in FIG. 4B, when the accelerator operation amount is equal to or greater than the threshold value α, the ignition timing is defined to be on the advance side as compared with when the accelerator operation amount α is less than the accelerator operation amount α. In this case as well, it is preferable to increase the engine torque at an early stage from the viewpoint of acceleration responsiveness.

In the map shown in 4B, when the engine speed is less than the predetermined value, the ignition timing is constant regardless of the accelerator operation amount. This is because, when the engine speed is low, even if the ignition timing is advanced, the combustion speed is less likely to increase and the engine torque is less likely to increase. When the engine speed is equal to or higher than the predetermined value, the rate of increase in the advance angle amount of the ignition timing with respect to the increase in the engine speed is defined to be larger when the accelerator operation amount is equal to or larger than the threshold value α than when the accelerator operation amount is equal to or larger than the threshold value α. Further, when the engine speed becomes higher than a predetermined value, the ignition timing is limited to be constant. This is because if the ignition timing is excessively controlled to the advance angle side, knocking may occur.

FIG. 4C is an exemplary map that defines the relation between the ignition timing and the predicted motor rotational speed. The vertical axis indicates the ignition timing [deg], and the horizontal axis indicates the predicted motor rotational speed [rpm]. The predicted motor rotational speed is a motor rotational speed at the time of engagement of K0 clutch 14 in the engine-start control, which is predicted based on the accelerator operation amount, which will be described in detail later. As shown in 4C, when the accelerator operation amount is either less than the threshold value α or greater than or equal to the threshold value α, the ignition timing is defined to be advanced as the predicted motor rotational speed is higher than or equal to the predetermined value. This is because the higher the predicted motor rotational speed, the larger the difference from the engine rotational speed prior to the engagement of K0 clutch 14, and it is preferable to secure the engine torque at the time of starting the engine 10. In FIG. 4C as well, when the accelerator operation amount is equal to or greater than the threshold value α, the ignition timing is defined to be on the advance side as compared with the case where the accelerator operation amount α is less than the accelerator operation amount α. In this case as well, it is preferable to increase the engine torque at an early stage from the viewpoint of acceleration responsiveness.

In the map of FIG. 4C, with respect to the rate of increase in the advance angle of the ignition timing with respect to the increase in the predicted motor rotational speed, when the accelerator operation amount is equal to or greater than the threshold value α, the accelerator operation amount is defined to be larger than when the accelerator operation amount is less than the threshold value α. This is because even when the amount of increase in the predicted motor rotational speed is the same, it is necessary to secure a larger increase rate of the engine torque than when the accelerator operation amount is larger than when the accelerator operation amount is smaller.

As described above, in the advance ignition start control, ECU 100 controls the ignition timing closer to the advance than the normal ignition start control. As a result, the engine torque at the time of starting the engine can be increased at an early stage in response to the driver's acceleration request, and the acceleration responsiveness is improved.

In the map of FIGS. 4A to 4C, the ignition timing changes linearly, but the present disclosure is not limited thereto, and may change in a curved shape or a stepped shape. Further, the present disclosure is not limited to the above-described map, and the ignition timing may be calculated by an arithmetic expression using the accelerator operation amount, the coolant temperature, the engine speed, and the predicted motor speed as arguments. Further, in the above-described map, when the accelerator operation amount is equal to or greater than the threshold value α, the ignition timing is defined regardless of the accelerator operation amount, but the present disclosure is not limited thereto. When the accelerator operation amount is equal to or larger than the threshold value α, the ignition timing may be defined so as to be on the advance side as the accelerator operation amount is larger.

Motor Rotational Speed Prediction Control

Next, the motor rotational speed prediction control for calculating the predicted motor rotational speed described above will be described. The motor rotational speed prediction control is an example of a process executed by the predicting unit. FIG. 5 is a flowchart illustrating an example of the motor rotational speed prediction control. The motor rotational speed prediction control is executed when there is a start request of the engine 10 and the accelerator operation amount is equal to or greater than the threshold value α.

First, ECU 100 calculates an accelerator operation amount and an accelerator operation amount change rate per unit-time when the engine 10 is requested to start based on the accelerator operation amount sensor 74 (step S11). Next, ECU 100 predicts the accelerator operation amount when K0 clutch 14 is engaged (step S12). Specifically, the accelerator operation amount at the time of engagement of K0 clutch 14 is predicted by multiplying the accelerator operation amount change rate by the time required for engagement of K0 clutch 14 after the start of the engine 10 is requested and adding the accelerator operation amount at the current time to the value obtained by the multiplication.

Next, ECU 100 predicts the required torque to the engine 10 when K0 clutch 14 is engaged based on the predicted accelerator operation amount (step S13). Specifically, the required torque to the engine 10 at the time of engagement of K0 clutch 14 is predicted as follows.

Figure 6A:
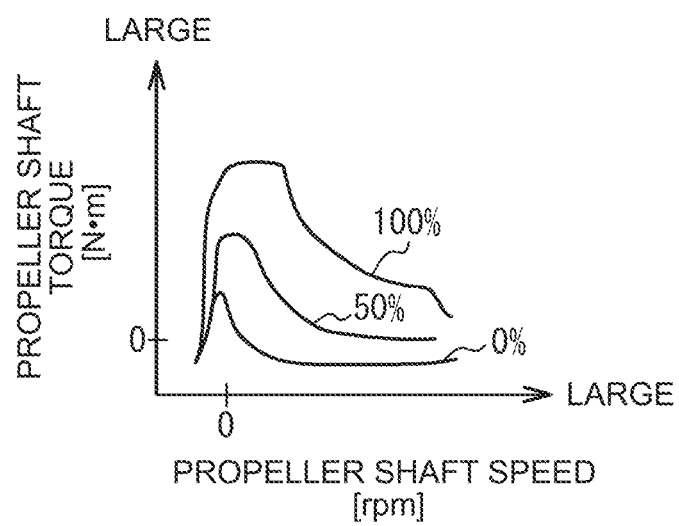
FIG. 6A is a map that defines a relation between a propeller shaft torque and a propeller shaft rotational speed for each accelerator operation amount.

ECU 100 calculates a required torque (hereinafter, referred to as a vehicle required torque) to the hybrid electric vehicle 1 from the predicted accelerator operation amount by referring to the map of FIG. 6A. FIG. 6A is a map that defines a relation between a propeller shaft torque and a propeller shaft rotational speed for each accelerator operation amount. The vertical axis indicates the propeller axis torque [Nm], and the horizontal axis indicates the propeller axis rotational speed [rpm]. The propeller shaft torque and the number of revolutions of the propeller shaft are the torque and the number of revolutions of the propeller shaft 12a. The propeller shaft torque corresponds to the required vehicle torque. In FIG. 6A, the accelerator operation amounts of 0%, 50%, and 100% are shown as exemplary cases. In the memories of ECU 100, such maps for the respective gear stages are stored.

As shown in 6A, as the accelerator operation amount increases, the propeller shaft torque, that is, the required vehicle torque increases. ECU 100 calculates a required torque of the vehicle on the basis of the predicted accelerator operation amount and the shift stage at the present time. Next, the required vehicle torque is multiplied by the current motor rotational speed to calculate a required output to the hybrid electric vehicle 1 (hereinafter, referred to as a vehicle required output).

Next, an output based on the charge/discharge request of the battery 16 (hereinafter, referred to as a charge/discharge request output) is added to the vehicle request output to calculate a request output to the engine 10 (hereinafter, referred to as an engine request output). The charge/discharge request output is calculated as a positive value when there is a charge request to the battery 16, as a negative value when there is a discharge request to the battery 16, and as 0 when there is no charge/discharge request to the battery 16. Next, the required engine torque (hereinafter, referred to as the required engine torque) to the engine 10 is calculated by dividing the required engine output by the current engine speed.

Next, ECU 100 calculates the predicted motor rotational speed based on the engine-required torque calculated in this manner (step S14). Specifically, ECU 100 refers to the map of FIG. 6B and predicts the motor speed at the time of engagement of K0 clutch 14 from the required engine torque. 6B is a map that defines the relation between the required torque and the motor rotational speed. The vertical axis indicates the required torque [N m], and the horizontal axis indicates the motor rotational speed [rpm].

Figure 6B:
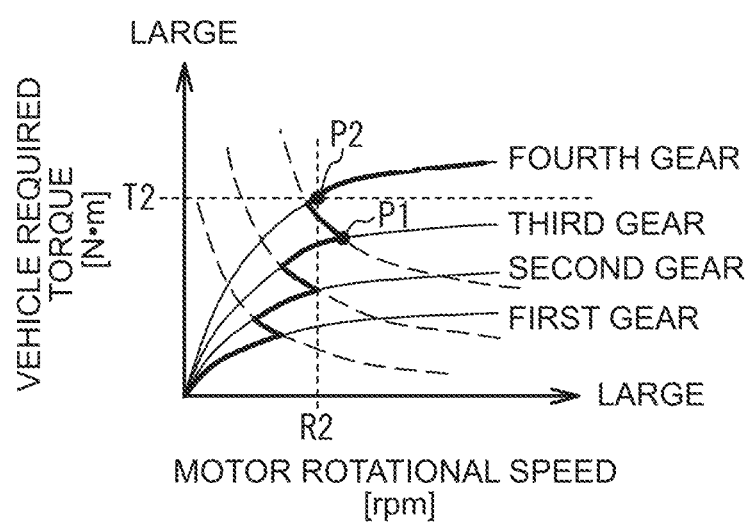
FIG. 6B is a map that defines the relation between the required torque of the motor and the rotational speed of the motor.

In FIG. 6B, the iso-output line is indicated by a dotted line, the relation between the rotational speed and the torque according to the gear stage is indicated by a thin line, and the actual operation line of the hybrid electric vehicle 1 is indicated by a thick line. For example, when the operating condition of the hybrid electric vehicle 1 indicates the operating point P1 and the gear stage is the third gear and the engine required torque T2, the predicted gear stage at the time of engagement of K0 clutch 14 is the fourth gear, and the predicted motor rotational speed is the rotational speed R2. In this way, the motor rotational speed at the time of engagement of K0 clutch 14 can be predicted based on the accelerator operation amount.

Since the ignition timing is advanced on the basis of the predicted motor rotational speed calculated as described above, the engine torque can be increased at an early stage corresponding to the predicted motor rotation speed, and the acceleration responsiveness is improved.

Figure 7:
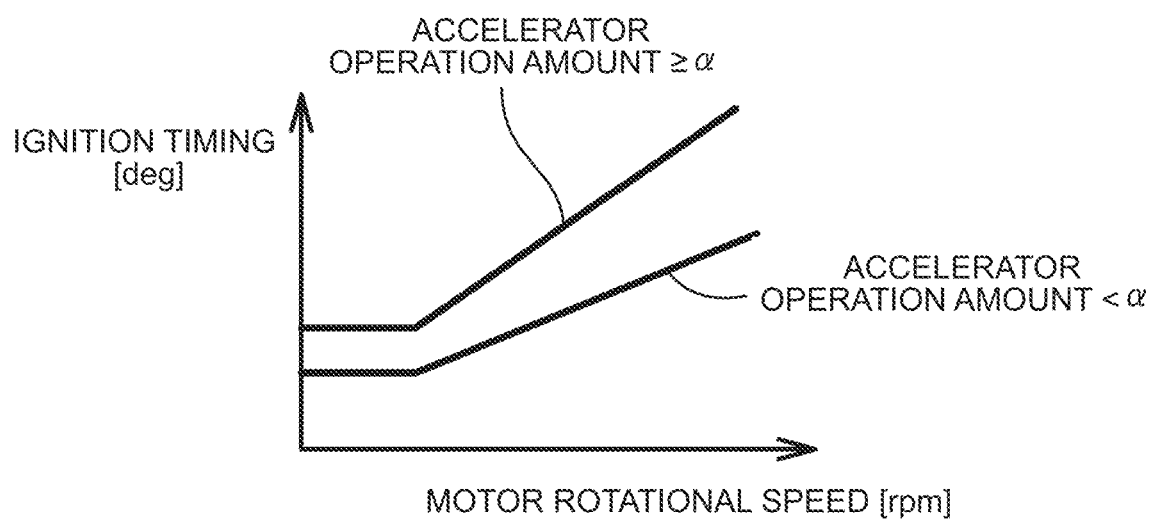
FIG. 7 is a map that defines the relationship between the ignition timing and the motor rotational speed.

Next, a modification will be described. In the above embodiment, ECU 100 calculates the advance angle of the ignition timing according to the predicted motor rotational speed. In contrast, in the modification, ECU 100 calculates the advance angle of the ignition timing in accordance with the motor rotational speed detected by the motor rotational speed sensor 73 when the engine 10 is requested to start. Specifically, ECU 100 refers to the map of FIG. 7 to calculate the advance angle of the ignition timing. FIG. 7 is a map that defines the relationship between the ignition timing and the motor rotational speed. The vertical axis indicates the ignition timing [deg], and the horizontal axis indicates the motor rotational speed [rpm]. FIG. 7 corresponds to FIG. 4C. In this case as well, in the same manner as in the map of FIG. 4C, in any case where the accelerator operation amount is less than the threshold value α and is equal to or greater than the threshold value α, the ignition timing is defined to be advanced as the motor rotational speed is higher. In the present modification, unlike the above-described embodiment, the motor rotational speed does not need to be predicted, so that ECU 100 process load is reduced.

In the above embodiment, the hybrid electric vehicle is controlled by a single ECU 100, but the present disclosure is not limited thereto. For example, the above-described control may be executed by a plurality of ECU such as an engine ECU for controlling the engine 10, a clutch ECU for controlling the motor ECU, K0 clutch 14 for controlling the motor 15, and a hybrid ECU for integrally controlling these ECU. For example, the above-described step 51 and S2 may be executed by the hybrid ECU, and the engine S3 and S4 may be executed by the engine ECU.

Although the embodiments of the present disclosure have been described in detail above, the present disclosure is not limited to such specific embodiments, and various modifications and changes can be made within the scope of the gist of the present disclosure described in the claims.

What is claimed is:

1. A hybrid electric vehicle, comprising:
   an engine;
   a motor provided on a power transmission path from the engine to a drive wheel;
   a clutch provided on the power transmission path between the engine and the motor;
   an accelerator operation amount detecting sensor configured to detect an accelerator operation amount; and
   a processor configured to, in response to a start request of the engine being given in a release state of the clutch, engage the clutch,
   crank the engine by the motor via the clutch, and
   start combustion in the engine while cranking the engine by the motor via the clutch, wherein
   the processor is configured to
      in response to the start request of the engine being given in the release state of the clutch, amount is equal to or larger than a threshold value, and
      in response to determining that the accelerator operation amount is equal to or greater than the threshold value,
      calculate, based on the accelerator operation amount sensor, (i) an accelerator operation amount and (ii) an accelerator operation amount change rate per time when the start request of the engine is given,
      predict the accelerator operation amount when the clutch is engaged,
      predict, based on the predicted accelerator operation amount, a required torque to the engine when the clutch is engaged,
      calculate, based on the predicted required torque to the engine, a predicted motor rotational speed, and
      advance an ignition timing of the engine as the predicted motor rotational speed of the motor increases, wherein the ignition timing of the engine is advanced to increase a torque of the engine at an earlier stage than when the accelerator operation amount is less than the threshold value.

2. The hybrid electric vehicle according to claim 1, further comprising:
   a motor rotational speed sensor configured to detect a rotational speed of the motor.

3. The hybrid electric vehicle according to claim 2, further comprising:

a temperature sensor configured to detect a temperature of the engine, wherein the processor is further configured to advance the ignition timing as the temperature of the engine decreases.

4. The hybrid electric vehicle according to claim 3, further comprising:

a crank angle sensor configured to detect a speed of the engine, wherein the processor is further configured to advance the ignition timing as the speed of the engine increases.

5. The hybrid electric vehicle according to claim 4, wherein the processor is further configured to advance the ignition timing as the accelerator operation amount increases.

6. The hybrid electric vehicle according to claim 1, wherein the accelerator operation amount is an amount of an accelerator pedal of the hybrid electric vehicle being depressed by a driver of the hybrid electric vehicle.

\* \* \* \* \*